(12) United States Patent
Ohtsuji

(10) Patent No.: US 11,122,493 B2
(45) Date of Patent: Sep. 14, 2021

(54) APPARATUS AND METHOD FOR RELAY SELECTION

(71) Applicant: NEC CORPORATION, Tokyo (JP)

(72) Inventor: Taichi Ohtsuji, Tokyo (JP)

(73) Assignee: NEC CORPORATION, Tokyo (JP)

( * ) Notice: Subject to any disclaimer, the term of this patent is extended or adjusted under 35 U.S.C. 154(b) by 91 days.

(21) Appl. No.: 16/465,420

(22) PCT Filed: Jun. 27, 2017

(86) PCT No.: PCT/JP2017/023508
§ 371 (c)(1),
(2) Date: May 30, 2019

(87) PCT Pub. No.: WO2018/105158
PCT Pub. Date: Jun. 14, 2018

(65) Prior Publication Data
US 2020/0008127 A1   Jan. 2, 2020

(30) Foreign Application Priority Data

Dec. 8, 2016   (JP) .............................. JP2016-238509

(51) Int. Cl.
*H04W 40/22* (2009.01)
*H04W 4/70* (2018.01)
(Continued)

(52) U.S. Cl.
CPC ........... *H04W 40/22* (2013.01); *H04L 1/0005* (2013.01); *H04W 4/70* (2018.02); *H04W 88/04* (2013.01); *H04W 92/18* (2013.01)

(58) Field of Classification Search
CPC ....... H04W 40/22; H04W 4/70; H04W 88/04; H04W 92/18; H04L 1/0005
See application file for complete search history.

(56) References Cited

U.S. PATENT DOCUMENTS

2009/0185492 A1   7/2009  Senarath et al.
2016/0337954 A1*  11/2016 Gulati ................... H04W 76/14
(Continued)

FOREIGN PATENT DOCUMENTS

| JP | 2011-514031 A | 4/2011 |
| JP | 2013-093781 A | 5/2013 |
| JP | 2016-096489 A | 5/2016 |

OTHER PUBLICATIONS

"3rd Generation Partnership Project; Technical Specification Group Services and System Aspects; Proximity-based services (ProSe); Stage 2 (Release 13)", 3GPP TS 23.303 V13.2.0 , Dec. 2015, pp. 1-122.

(Continued)

*Primary Examiner* — Ajay Cattungal
(74) *Attorney, Agent, or Firm* — Sughrue Mion, PLLC

(57) ABSTRACT

A relay terminal (2) transmits selection assistance information to a remote terminal (1). The selection assistance information includes a first information element transmitted from a base station (3) and received by the relay terminal (2). The first information element indicates at least one of: (a) a frequency band of the base station (3); a system bandwidth; downlink transmission power; UL/DL configuration; the number of cells provided to the relay terminal; a type of a cell; a RAT or a communication scheme used between the base station (3) and the relay terminal (2); and a name or identifier of a mobile operator providing the base station. This is thus, for example, possible to contribute to improving appropriateness of a relay selection.

20 Claims, 6 Drawing Sheets

(51) Int. Cl.
*H04L 1/00* (2006.01)
*H04W 88/04* (2009.01)
*H04W 92/18* (2009.01)

(56) References Cited

U.S. PATENT DOCUMENTS

| 2017/0325243 | A1* | 11/2017 | Yasukawa | H04W 88/04 |
| 2018/0184436 | A1* | 6/2018 | Ohtsuji | H04B 7/2606 |
| 2018/0199390 | A1* | 7/2018 | Hahn | H04W 56/0015 |
| 2018/0249516 | A1* | 8/2018 | Jung | H04W 76/14 |

OTHER PUBLICATIONS

"3rd Generation Partnership Project; Technical Specification Group Services and System Aspects; Study on extended architecture support for proximity-based services (Release 13)", 3GPP TR 23.713 V13.0.0, Sep. 2015, pp. 1-80.

"Support of UE-Network relays", Qualcomm Incorporated, 3GPP TSG-RAN WG1 #81, R1-152778, May 25-29, 2015, 10 pages, Fukuoka, Japan.

"UE-to-Network Relay conclusions", Qualcomm Incorporated, SA WG2 Meeting #108, S2-150925, Apr. 13-17, 2015, pp. 1-4, San Jose Del Cabo, Mexico.

"Discussion on UE-to-Network Relay measurement", Sony, 3GPP TSG RAN WG1 Meeting #81-c, R1-153087, May 25-29, 2015, 4 pages, Fukuoka, Japan.

"Role of eNB when remote UE is in coverage", Qualcomm Incorporated, 3GPP TSG-RAN WG2 Meeting #90, R2-152560, May 25-29, 2015, 5 pages, Fukuoka, Japan.

"Views on UE-to-Network Relay Discovery", NTT DOCOMO, 3GPP TSG RAN WG1 Meeting #80bis, R1-151965, Apr. 20-24, 2015, pp. 1-6, Belgrade, Serbia.

"Discussion on Relay Selection", NTT DOCOMO, 3GPP TSG RAN WG1 Meeting #81, R1-153188, May 25-29, 2015, pp. 1-4, Fukuoka, Japan.

"Update and Evaluation UE-to-network relay solution R12", Huawei, Hisilicon, 3GPP TSG SA WG2 Meeting #100, S2-134066, Nov. 11-15, 2013, pp. 1-6, San Francisco, USA.

"Radio resource configuration changes for CA, UE specific", Samsung, 3GPP TSG-RAN2#70 bis meeting, R2-103795, Jun. 28-Jul. 2, 2010, 8 pages, Stockholm, Sweden.

"Pcell and Scell Common information", Panasonic, 3GPP TSG RAN WG2#70bis, R2-103609, Jun. 28-Jul. 2, 2010, 3 pages, Stockholm, Sweden.

"Considerations on ProSe Relays Selection", Sony, SA WG2 Meeting #105, S2-143134, Oct. 13-17, 2014, pp. 1-7, Sapporo, Japan.

International Search Report for PCT/JP2017/023508 dated Aug. 29, 2017 (PCT/ISA/210).

* cited by examiner

APPARATUS AND METHOD FOR RELAY SELECTION

CROSS REFERENCE TO RELATED APPLICATIONS

This application is a National Stage of International Application No. PCT/JP2017/023508 filed Jun. 27, 2017, claiming priority based on Japanese Patent Application No. 2016-238509 filed Dec. 8, 2016, the disclosure of which is incorporated herein in its entirety by reference.

TECHNICAL FIELD

The present disclosure relates to inter-terminal direct communication (i.e., device-to-device (D2D) communication) and, in particular, to a selection of a relay terminal.

BACKGROUND ART

In some implementations, a radio terminal is configured to directly communicate with other radio terminals. Such communication is referred to as device-to-device (D2D) communication. The D2D communication includes at least one of direct communication and direct discovery. In some implementations, a plurality of radio terminals supporting D2D communication form a D2D communication group autonomously or under the control of a network, and perform communication with other radio terminals in the formed D2D communication group.

Third Generation Partnership Project (3GPP) Release 12 specifies Proximity-based services (ProSe) (see, for example, Non-patent Literature 1). ProSe includes ProSe discovery and ProSe direct communication. ProSe discovery makes it possible to detect proximity (in proximity) of radio terminals. ProSe discovery includes direct discovery (ProSe Direct Discovery) and network-level discovery (EPC-level ProSe Discovery).

ProSe Direct Discovery is performed through a procedure in which a radio terminal capable of performing ProSe (i.e., ProSe-enabled User Equipment (UE)) detects another ProSe-enabled UE by using only the capability of a radio communication technology (e.g., Evolved Universal Terrestrial Radio Access (E-UTRA) technology) possessed by these two UEs. On the other hand, in EPC-level ProSe Discovery, a core network (i.e., Evolved Packet Core (EPC)) determines proximity of two ProSe-enabled UEs and notifies these UEs of the detection of proximity. ProSe Direct Discovery may be performed by three or more ProSe-enabled UEs.

ProSe direct communication makes it possible to establish a communication path(s) between two or more ProSe-enabled UEs existing in a direct communication range after the ProSe discovery procedure is performed. In other words, ProSe direct communication enables a ProSe-enabled UE to directly communicate with another ProSe-enabled UE, without traversing a Public Land Mobile Network (PLMN) including a base station (eNodeB). ProSe direct communication may be performed by using a radio communication technology that is also used to access a base station (eNodeB) (i.e., E-UTRA technology), or by using a non-3GPP radio technology such as a wireless local area network (WLAN) radio technology (i.e., IEEE 802.11 radio technology) or a Bluetooth (Registered Trademark) radio technology.

ProSe direct discovery and ProSe direct communication are performed on an inter-UE direct interface. This direct interface is referred to as a PC5 interface or a sidelink. That is, ProSe direct discovery and ProSe direct communication are examples of the D2D communication. The D2D communication can be referred to as sidelink communication or peer-to-peer communication.

In 3GPP Release 12, a ProSe function communicates with a ProSe-enabled UE through a Public Land Mobile Network (PLMN) and assists ProSe discovery and ProSe direct communication. The ProSe function is a logical function that is used for PLMN-related operations required for ProSe. The functionality provided by the ProSe function includes, for example: (a) communication with third-party applications (a ProSe Application Server), (b) authentication of a UE for ProSe discovery and ProSe direct communication, (c) transmission of configuration information for ProSe discovery and ProSe direct communication (e.g., EPC-ProSe-User ID) to a UE, and (d) providing of network-level discovery (i.e., EPC-level ProSe discovery). The ProSe function may be implemented in one or more network nodes or entities. In this specification, one or more network nodes or entities that implement the ProSe function are referred to as "ProSe function entities" or "ProSe function servers".

3GPP Release 12 further defines a partial coverage scenario where one UE is located outside the network coverage and another UE is located within the network coverage (see, for example, Sections 4.4.3, 4.5.4 and 5.4.4 of Non-Patent Literature 1). In the partial coverage scenario, the UE outside the coverage is referred to as a "remote UE", and the UE that is in coverage and performs relaying between the remote UE and the network is referred to as a "ProSe UE-to-Network Relay". The ProSe UE-to-Network Relay relays traffic (downlink and uplink) between the remote UE and the network (E-UTRA network (E-UTRAN) and EPC).

More specifically, the ProSe UE-to-Network Relay attaches to the network as a UE, establishes a PDN connection to communicate with a ProSe function entity or another Packet Data Network (PDN), and communicates with the ProSe function entity to start ProSe direct communication. The ProSe UE-to-Network Relay further performs the discovery procedure with the remote UE, communicates with the remote UE on the inter-UE direct interface (e.g., sidelink or PC5 interface), and relays traffic (downlink and uplink) between the remote UE and the network. When the Internet Protocol version 4 (IPv4) is used, the ProSe UE-to-Network Relay operates as a Dynamic Host Configuration Protocol Version 4 (DHCPv4) Server and Network Address Translation (NAT). When the IPv6 is used, the ProSe UE-to-Network Relay operates as a stateless DHCPv6 Relay Agent.

Further, in 3GPP Release 13 and Release 14, extensions of ProSe have been discussed (see, for example, Non-patent Literatures 2 to 8). This discussion includes a discussion about relay selection criteria for selecting a ProSe UE-to-Network Relay and a ProSe UE-to-UE Relay and a discussion about a relay selection procedure including arrangement of a relay selection. Note that, the ProSe UE-to-UE Relay is a UE that relays traffic between two remote UEs.

Regarding the arrangement of the relay selection for the UE-to-Network Relay, a distributed relay selection architecture in which a remote UE selects a relay (see, for example, Non-patent Literatures 3-5, 7 and 8) and a centralized relay selection architecture in which an element in a network such as a base station (i.e., eNodeB (eNB)) selects a relay (see, for example, Non-patent Literatures 6 and 7) have been proposed. Regarding the criteria for the relay selection for the UE-to-Network Relay, it has been proposed to consider D2D link quality between a remote UE and a relay UE, consider backhaul link quality between a relay UE and an eNB, and consider both the D2D link quality and the backhaul link quality (see, for example, Non-patent Literatures 3 to 8).

For example, Non-patent Literature 3 to 5 discloses that both D2D link quality and backhaul link quality are considered in the distributed relay selection. In an example, a remote UE considers both the D2D link quality and the backhaul link quality by using an evaluation formula, i.e., w*D2D link quality+(1−w)*backhaul link quality, where w is a predefined constant (see Non-Patent Literature 3). In some implementations, a relay UE transmits a discovery message indicating radio quality of a backhaul link (i.e., between the relay UE and an eNB) to assist relay selection performed by a remote UE (see Non-Patent Literature 4). Alternatively, a relay UE may implicitly indicate radio quality of a backhaul link to a remote UE to assist relay selection performed by the remote UE. For example, priority information in a discovery signal is used to implicitly indicate the radio quality of the backhaul link (see Non-Patent Literature 5).

For example, Non-patent Literature 6 states that both D2D link quality and backhaul link quality are considered in the centralized relay selection. In an example, a remote UE reports D2D link quality to an eNB and the eNB selects a relay for the remote UE while considering the reported D2D link quality and (reported) backhaul link quality. The backhaul link quality may be acquired by a measurement performed by the eNB or by measurement reporting by the relay UE in an existing cellular network.

For example, in Non-Patent Literature 7 and 8, an eNB selects one or more relay candidate UEs while taking into account backhaul link quality. Only these relay candidate UEs can be found by the remote UE in the relay discovery procedure. The remote UE selects a relay from among the one or more relay candidates based on the D2D link quality. Since the backhaul link quality is considered in the selection of the relay candidates performed by the eNB, it is also indirectly considered in the relay selection performed by the remote UE.

In the specification, a radio terminal having the D2D communication capability and the relay capability, such as the ProSe UE-to-Network Relay and the ProSe UE-to-UE Relay, is referred to as a "relay radio terminal" or a "relay UE". Further, a radio terminal that receives a relay service provided by a relay UE is referred to as a "remote radio terminal" or a "remote UE".

CITATION LIST

Patent Literature

Patent Literature 1: Japanese Unexamined Patent Application Publication No. 2016-096489
Patent Literature 2: Japanese Unexamined Patent Application Publication No. 2013-093781

Non Patent Literature

Non-Patent Literature 1: 3GPP TS 23.303 V13.2.0 (2015-December), "3rd Generation Partnership Project; Technical Specification Group Services and System Aspects; Proximity-based services (ProSe); Stage 2 (Release 13)", December 2015
Non-Patent Literature 2: 3GPP TR 23.713 V13.0.0 (2015-September), "3rd Generation Partnership Project; Technical Specification Group Services and System Aspects; Study on extended architecture support for proximity-based services (Release 13)", September 2015
Non-Patent Literature 3: 3GPP R1-152778, "Support of UE-Network relays", Qualcomm Incorporated, May 2015
Non-Patent Literature 4: 3GPP S2-150925, "UE-to-Network Relay conclusions", Qualcomm Incorporated, April 2015
Non-Patent Literature 5: 3GPP R1-153087, "Discussion on UE-to-Network Relay measurement", Sony, May 2015
Non-Patent Literature 6: 3GPP R2-152560, "Role of eNB when remote UE is in coverage", Qualcomm Incorporated, May 2015
Non-Patent Literature 7: 3GPP R1-151965, "Views on UE-to-Network Relay Discovery", NTT DOCOMO, April 2015
Non-Patent Literature 8: 3GPP R1-153188, "Discussion on Relay Selection", NTT DOCOMO, May 2015

SUMMARY OF INVENTION

Technical Problem

The inventor has studied a relay selection, found several problems including problems specifically described below, and conceived some improvements to address these problems.

For example, Non-patent Literature 3 to 8 describes that either or both of D2D link quality and backhaul link quality is considered in a relay selection for a remote UE. Specifically, Non-patent Literature 3 describes that specific examples of the backhaul link quality includes a downlink (DL) Reference Signal Received Power (RSRP) and a DL Signal-to-Interference plus Noise Ratio (SINR), and that the DL RSRP or DL SINR of the backhaul link is considered in a relay selection. However, Non-patent Literatures 3 to 8 does not disclose other metrics or parameters regarding the backhaul link between the eNB and the relay UE are considered in the relay selection.

A relay UE having the best DL RSRP is not necessarily able to provide the best throughput to a remote UE. As an example, when a system bandwidth (e.g., 100 MHz) available to a relay UE (e.g., a second relay UE) other than a first relay UE having the best DL RSRP is larger than a system bandwidth (e.g., 20 MHz) available to the first relay UE, the second relay UE may be able to provide a higher throughput to a remote UE than the first relay UE is. In another example, when a Radio Access Technology (RAT) (e.g., New Radio (NR) or 5G RAT) used between a second relay UE and a base station supports communication higher than that supported by a RAT (e.g., Long Term Evolution (LTE)) used between a first relay UE having the best DL RSRP and the base station, the second relay UE may be able to provide a higher throughput to a remote UE than the first relay UE is.

Patent Literature 1 discloses that a relay UE forwards broadcast messages (e.g., Earthquake and Tsunami Warning System (ETWS) information) or a control message (e.g., allocation information indicating D2D radio resources used in the coverage) sent from a base station to a remote UE on a D2D path. However, nowhere does Patent Literature 1 disclose that the remote UE uses the broadcast message or the control message sent from the base station for the relay UE selection.

Patent Literature 2 discloses that a base station (i.e., anchor Access Point (AP)) selects a single path communicating communicate with a remote UE (a terminal), from among a plurality of paths that reach the terminal through one or more relays (i.e., drift APs). The metric used for selecting a path includes a metric indicating path quality. The path quality metric includes, for example, field intensity in each radio section, a signal to interference and noise ratio (SINR), a carrier to interference and noise ratio (CINR), a packet loss rate, a hop count, etc. The path quality metric may further indicate an available capacity of radio resources (or an amount of remaining radio resources) of one or both of the relay (i.e., drift AP) and the remote UE (i.e., terminal). The path quality metric may further indicate processing power of one or both of the relay (i.e., drift AP) and the remote UE (i.e., terminal). However, Patent Literature 2 merely teaches the centralized relay selection performed by the base station. Patent Literature 2 does not disclose that the relay UE sends, to the remote UE, some information to be used by the remote UE for distributed relay selection.

One of the objects to be attained by embodiments disclosed herein is to provide an apparatus, a method, and a program that contribute to improving appropriateness of a relay selection. It should be noted that this object is merely one of the objects to be attained by the embodiments disclosed herein. Other objects or problems and novel features will be apparent from the following description and the accompanying drawings.

Solution to Problem

In a first aspect, a radio terminal includes a memory and at least one processor coupled to the memory. The at least one processor is configured to receive selection assistance information from each of one or more relay terminals and select at least one specific relay terminal suitable for the radio terminal from among the one or more relay terminals based on the selection assistance information. Each specific relay terminal is configured to relay traffic between the radio terminal and a base station through a device-to-device (D2D) link between the specific relay terminal and the radio terminal and through a backhaul link between the specific relay terminal and the base station. The selection assistance information includes a first information element transmitted from the base station and received by each relay terminal. The first information element indicates at least one of:
(a) a frequency band supported by the base station;
(b) a system bandwidth supported by the base station;
(c) downlink transmission power of the base station;
(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

In a second aspect, a relay terminal includes a memory and at least one processor coupled to the memory. The at least one processor is configured to transmit selection assistance information to a remote terminal. The at least one processor is further configured to relay traffic between the remote terminal and a base station through a device-to-device (D2D) link between the relay terminal and the remote terminal and through a backhaul link between the relay terminal and the base station. The selection assistance information includes a first information element transmitted from the base station and received by the relay terminal. The first information element indicates at least one of:
(a) a frequency band supported by the base station;
(b) a system bandwidth supported by the base station;
(c) downlink transmission power of the base station;
(d) an uplink/downlink configuration of each cell that the base station provides to the relay terminal;
(e) the number of cells that the base station provides to the relay terminal;
(f) a type of one or more cells that the base station provides to the relay terminal;
(g) a Radio Access Technology (RAT) or a communication scheme used between the base station and the relay terminal; and
(h) a name or identifier of a mobile operator providing the base station.

In a third aspect, a method performed in a radio terminal includes: receiving selection assistance information from each of one or more relay terminals; and selecting at least one specific relay terminal suitable for the radio terminal from among the one or more relay terminals based on the selection assistance information. The selection assistance information is similar to that in the first aspect.

In a fourth aspect, a method performed in a relay terminal includes: transmitting selection assistance information to a remote terminal, and relaying traffic between the remote terminal and a base station through a device-to-device (D2D) link between the relay terminal and the remote terminal and through a backhaul link between the relay terminal and the base station. The selection assistance information is similar to that in the second aspect.

In a fifth aspect, a program includes a set of instructions (software codes) that, when loaded into a computer, causes the computer to perform a method according to the above-described third or fourth aspect.

Advantageous Effects of Invention

According to the above-described aspects, it is possible to provide an apparatus, a method, and a program that contribute to improving appropriateness of a relay selection.

DESCRIPTION OF EMBODIMENTS

Specific embodiments are described hereinafter in detail with reference to the drawings. The same or corresponding elements are denoted by the same symbols throughout the drawings, and duplicated explanations are omitted as necessary for the sake of clarity.

Each of the embodiments described below can be used individually, or two or more of the embodiments may be appropriately combined with one another. These embodiments include novel features different from one another. Accordingly, these embodiments contribute to attaining objects or solving problems different from one another, and thus contribute to providing advantages different from one another.

First Embodiment

Figure 1:
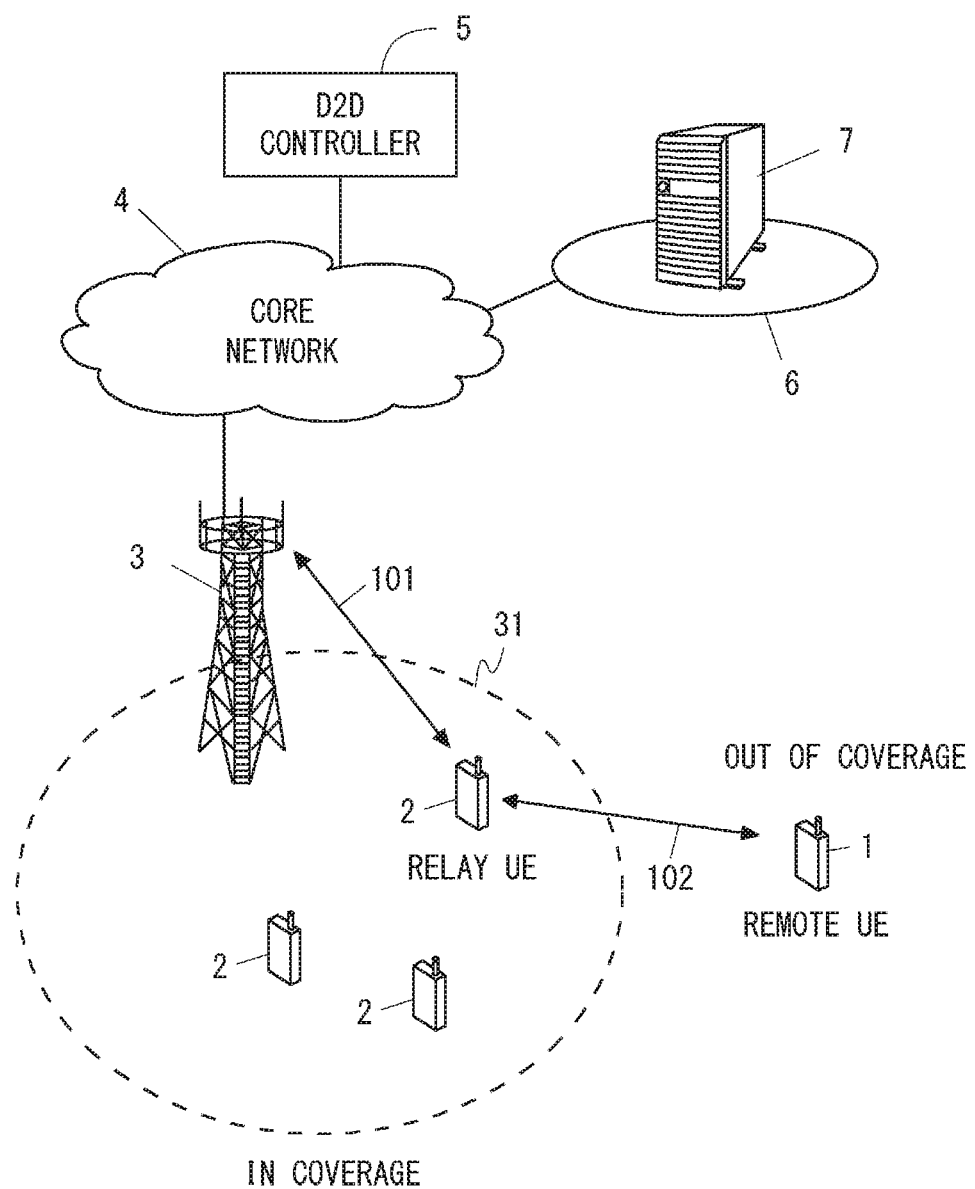
FIG. 1 shows a configuration example of a radio communication network according to a plurality of embodiments.

FIG. 1 shows a configuration example of a radio communication network according to some embodiments including this embodiment. Specifically, FIG. 1 shows an example related to a UE-to-Network Relay. That is, a remote UE 1 includes at least one radio transceiver and is configured to perform D2D communication (e.g., ProSe direct discovery and ProSe direct communication) with one or more relay UEs 2 on a D2D link 102 (e.g., PC5 interface or sidelink). Further, though not shown in FIG. 1, the remote UE 1 is configured to perform cellular communication in a cellular coverage 31 provided by one or more base stations 3. The cellular coverage 31 includes one or more cells.

Each relay UE 2 includes at least one radio transceiver and is configured to perform cellular communication with the base station 3 on a cellular link 101 in the cellular coverage 31 and perform D2D communication (e.g., ProSe direct discovery and ProSe direct communication) with the remote UE 1 on the D2D link 102.

The base station 3 is an entity disposed in a radio access network (i.e., E-UTRAN), provides the cellular coverage 31 including one or more cells, and is able to communicate with each relay UE 2 on the cellular link 101 by using a cellular communication technology (e.g., E-UTRA technology). Further, the base station 3 is configured to perform cellular communication with the remote UE 1 when the remote UE 1 is in the cellular coverage 31.

A core network (i.e., Evolved Packet Core (EPC)) 4 includes a plurality of user-plane entities (e.g., Serving Gateway (S-GW) and Packet Data Network Gateway (P-GW)) and a plurality of control-plane entities (e.g., Mobility Management Entity (MME) and Home Subscriber Server (HSS)). The user-plane entities relay user data of the remote UE 1 and user data of the relay UE 2 between an external network and a radio access network including the base station 3. The control-plane entities perform various types of control for the remote UE 1 and the relay UE 2 including mobility management, session management (bearer management), subscriber information management, and billing management.

In some implementations, the remote UE 1 and the relay UE 2 are configured to communicate with a D2D controller 5 through the base station 3 and the core network 4 to use a proximity-based service (e.g., 3GPP ProSe). For example, in the case of 3GPP ProSe, the D2D controller 5 corresponds to a ProSe function entity. The remote UE 1 and the relay UE 2 may use, for example, a network-level discovery (e.g., EPC-level ProSe Discovery) provided by the D2D controller 5, receive from the D2D controller 5 a message indicating a permission for the remote UE 1 and the relay UE 2 to start (or activate) D2D communication (e.g., ProSe direct discovery and ProSe direct communication), or receive from the D2D controller 5 configuration information regarding D2D communication in the cellular coverage 31.

In the example shown in FIG. 1, the relay UE 2 operates as a UE-to-Network Relay and provides the remote UE 1 with a relay operation between the remote UE 1 and the cellular network (i.e., the base station 3 and the core network 4). In other words, the relay UE 2 relays a data flow (traffic) regarding the remote UE 1 between the remote UE 1 and the cellular network (i.e., the base station 3 and the core network 4). In this way, the remote UE 1 can communicate with a node 7 located in an external network 6 through the relay UE 2 and the cellular network (i.e., the base station 3 and the core network 4).

In the example shown in FIG. 1, the remote UE 1 is located outside the cellular coverage 31 (i.e., out of coverage). However, as already described, the remote UE 1 may be located within the cellular coverage 31. In some implementations, when the remote UE 1 cannot connect to the cellular network (the base station 3 and the core network 4) under some conditions (e.g., a selection by a user), the remote UE 1 may perform D2D communication (e.g., direct communication) with the relay UE 2. In some implementations, the remote UE 1 may further perform D2D communication with the relay UE 2 while performing cellular communication directly with the base station 3 within the coverage 31 of the base station 3. In some implementations, the remote UE 1 may determine which of the direct cellular communication (hereinafter referred to as a direct path) with the base station 3 and the D2D communication (hereinafter referred to as a relay path) with one of the relay UEs 2 is to be used.

Figure 2:
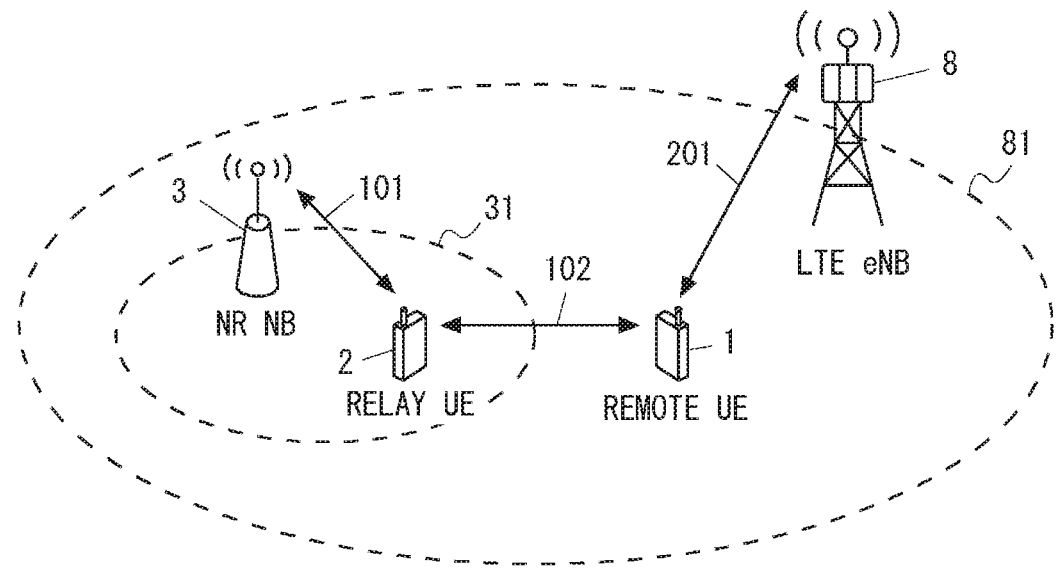
FIG. 2 shows a configuration example of a radio communication network according to a plurality of embodiments.

FIG. 2 shows another configuration example of a radio communication network according to some embodiments. In the example shown in FIG. 2, a remote UE 1 is located within a cellular coverage 81 of a base station 8. The cellular coverage 81 includes one or more cells. The remote UE 1 is configured to perform cellular communication with the base station 8 on a cellular link 201. In some implementations, the remote UE 1 may determine which of the direct cellular communication with the base station 8 through the cellular link 201 (i.e., the direct path) and the D2D communication with one of the relay UEs 2 through the D2D link 102 (i.e., the relay path) is to be used.

In the example shown in FIG. 2, the radio communication network may have Heterogeneous Network (HetNet) architecture. In an example, the base station 8 may be a macro base station while the base station 3 may be a pico base station, and the macro cell (i.e., the cellular coverage 81) of the base station 8 may completely cover the pico cell (i.e., the cellular coverage 31) of the base station 3.

Additionally or alternatively, the base station 3 (or the cellular coverage 31) and the base station 8 (or the cellular coverage 81) may support different Radio Access Technologies (RATs). As shown in FIG. 2, the base station 8 may be an LTE eNodeB (eNB) supporting the LTE RAT, while the base station 3 may be an NR NodeB (NR NB) supporting the New Radio (NR). The 3GPP has started the standardization for the fifth generation mobile communication system (5G) to make 5G a commercial reality in 2020 or later. It has been assumed that 5G is realized by continuous enhancement/evolution of LTE and LTE-Advanced and an innovative enhancement/evolution by an introduction of a new 5G air interface (i.e., a new Radio Access Technology (RAT)). The new RAT supports, for example, frequency bands higher than the frequency bands (e.g., 6 GHz or lower) supported by LTE/LTE-Advanced and its continuous evolution. For example, the new RAT supports centimeter-wave bands (10 GHz or higher) and millimeter-wave bands (30 GHz or higher). The fifth generation mobile communication system is referred to as a Next Generation (NextGen) System (NG System). The new RAT for the NG System is referred to as a New Radio (NR), a 5G RAT, or a NG RAT. The term "LTE" used in this specification includes enhancement/evolution of LTE and LTE-Advanced to provide interworking with the NG System, unless otherwise specified. The enhancement/evolution of LTE and LTE-Advanced for the interworking with the NG System is also referred to as LTE-Advanced Pro, LTE+, or enhanced LTE (eLTE).

Figure 3:
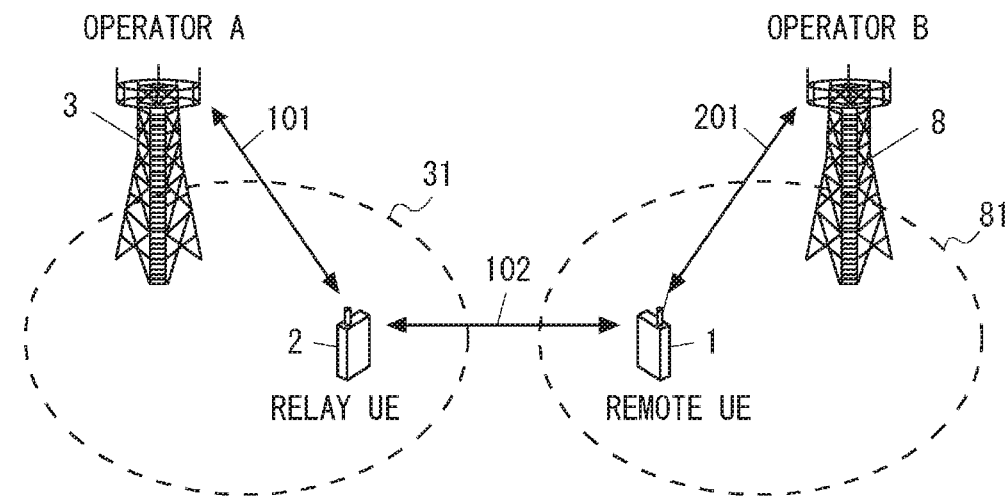
FIG. 3 shows a configuration example of a radio communication network according to a plurality of embodiments.

Additionally or alternatively, as shown in FIG. 3, the base stations 3 and 8 may be operated by different mobile operators. In the example shown in FIG. 3, the base station 3 and its cellular coverage 31 are operated by an operator A, while the base station 8 and its cellular coverage 81 are operated by an operator B. The relay UE 2 can access the base station 3 by using subscription credentials for the operator A. Meanwhile, the remote UE 1 can access the base station 8 by using subscription credentials for the operator B. These subscription credentials are stored, for example, in Universal Integrated Circuit Cards (UICCs) of the remote UE 1 and the relay UE 2, respectively.

Next, a procedure for starting a relay operation according to some embodiments including this embodiment is described with reference to FIG. 4. To start a relay, it is necessary to perform "relay discovery" to find one or more relay UEs 2 that the remote UE 1 can use and also perform a relay selection to select at least one specific relay UE suitable for the remote UE 1 from among the one or more found relay UEs 2. Each of the relay UEs 2 which have not been selected yet can also be referred to as a relay UE candidate or a relay candidate. As already described, the relay selection is performed by the remote UE 1 in some implementations (i.e., the distributed relay selection).

Figure 4:
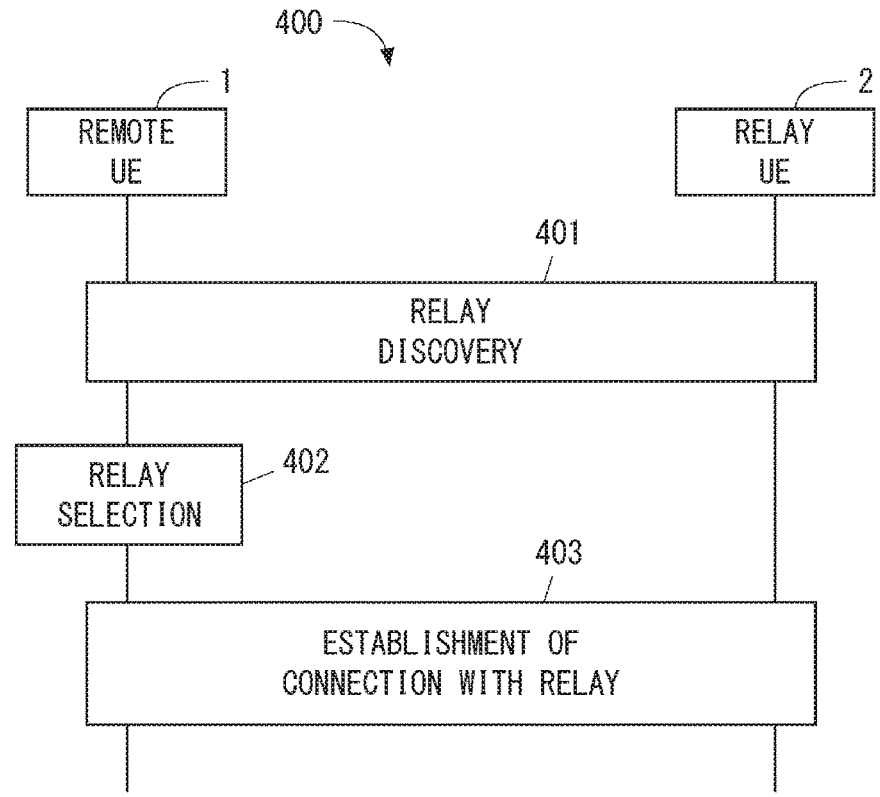
FIG. 4 is a sequence diagram showing an example of a procedure for starting a relay operation according to a plurality of embodiments.

FIG. 4 shows a process 400 that is an example of a procedure according to the distributed relay selection. In Step 401, the remote UE 1 and the relay UE 2 perform a relay discovery procedure so that the remote UE 1 finds the relay UE 2 which serves as a UE-to-Network Relay or a UE-to-UE Relay. For example, in accordance with the so-called announcement model (i.e., model A), the relay UE 2 may transmit a discovery signal and the remote UE 1 may find the relay UE 2 by detecting the discovery signal transmitted from the relay UE 2. Alternatively, in accordance with the so-called solicitation/response model (i.e., model B), the remote UE 1 may transmit a discovery signal indicating that it desires a relay and the relay UE 2 may transmit a response message to this discovery signal to the UE 1, and then the remote UE 1 may find the relay UE 2 by receiving the response message transmitted from the relay UE 2.

In Step 402, the remote UE 1 selects at least one specific suitable relay UE 2 from among the one or more relay UEs 2 found in Step 401. Details of a relay selection procedure according to this embodiment will be described later.

In Step 403, the remote UE 1 establishes a connection for one-to-one D2D communication (i.e., direct communication) with any one of the at least one selected specific relay UE. For example, the remote UE 1 may transmit a direct communication request (or a relay request) to the relay UE 2. Upon receiving the direct communication request (or the relay request), the relay UE 2 may start a procedure for mutual authentication.

Figure 5:
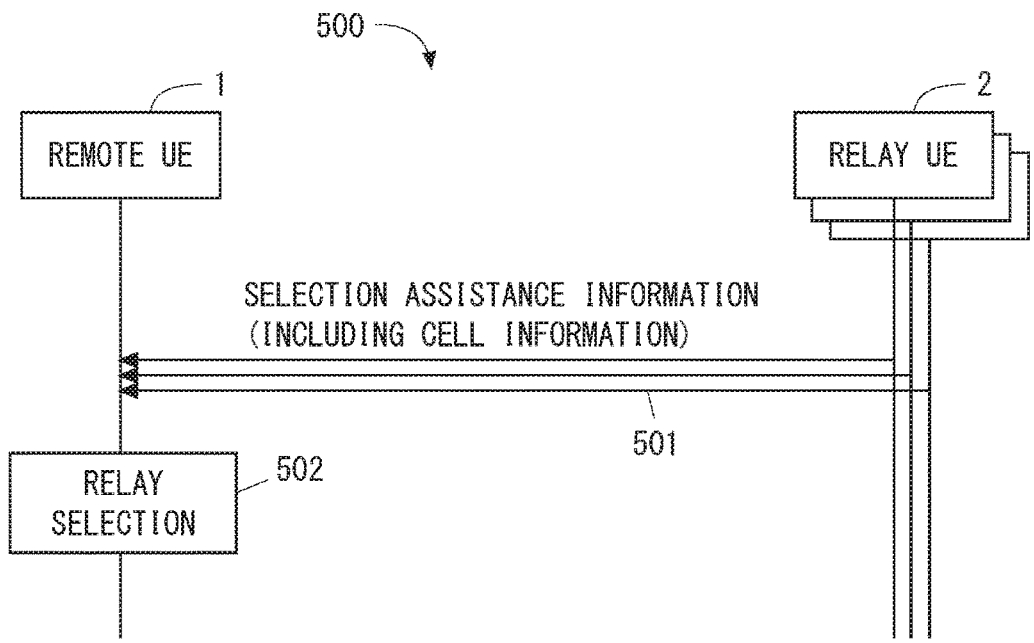
FIG. 5 is a sequence diagram showing an example of a procedure for starting a relay operation according to a first embodiment.

Next, a specific example of a relay selecting procedure according to this embodiment is described. FIG. 5 is a sequence diagram showing a process 500 that is an example of a relay selection performed by the remote UE 1. In Step 501, each relay UE 2 transmits selection assistance information to the remote UE 1. The remote UE 1 receives from the selection assistance information from each relay UE 2. Each relay UE 2 may transmit the selection assistance information in the relay discovery procedure (e.g., in Step 401 in FIG. 4). Specifically, according to the so-called announcement model (i.e., model A), each relay UE 2 may transmit a discovery signal containing the selection assistance information. In this way, the remote UE 1 can find relay UEs 2 by detecting their discovery signals and receive the selection assistance information from these relay UEs 2.

The selection assistance information includes cell information. The cell information can also be referred to as base-station information. The cell information (or base-station information) is information that is transmitted from the base station 3 and received by each relay terminal 2. That is, each relay UE 2 receives cell information transmitted by the base station 3 and forwards the received cell information to the remote UE 1. The cell information may be broadcast information that can be received by a plurality of UEs. In other words, the cell information may be broadcast within the cellular coverage 31 by the base station 3. For example, a Broadcast Control Channel (BCCH), which is one of logical channels in LTE, may be used to transmit the cell information. Alternatively, the cell information may be transmitted to each relay UE 2 in dedicated signaling (e.g., Radio Resource Control (RRC) signaling) between the base station 3 and each relay UE 2. Specific examples of the cell information will be described later.

In Step 502, the remote UE 1 performs a relay selection by using the selection assistance information received from each relay UE 2. In the relay selection in Step 502, the remote UE 1 may select at least one specific relay UE for the remote UE 1 from among one or more relay UEs 2 (i.e., relay UE candidates). For example, the remote UE 1 estimates uplink quality of each relay UE 2 by using the selection assistance information received from each relay UE 2 and performs relay selection while considering the estimated uplink quality of each relay UE 2.

Additionally or alternatively, in the relay selection in Step 502, the remote UE 1 may determine which of the relay path (e.g., the cellular link 101 and the D2D link 102 in FIG. 2 or 3) and the direct path (e.g., the cellular link 201 in FIG. 2 or 3) is to be used for the remote UE 1. Specifically, the remote UE 1 may make comparisons among the estimated throughputs of the one or more relay paths and the estimated throughput of the direct path, and select a path corresponding to the best estimated throughput for the remote UE 1.

Figure 6:
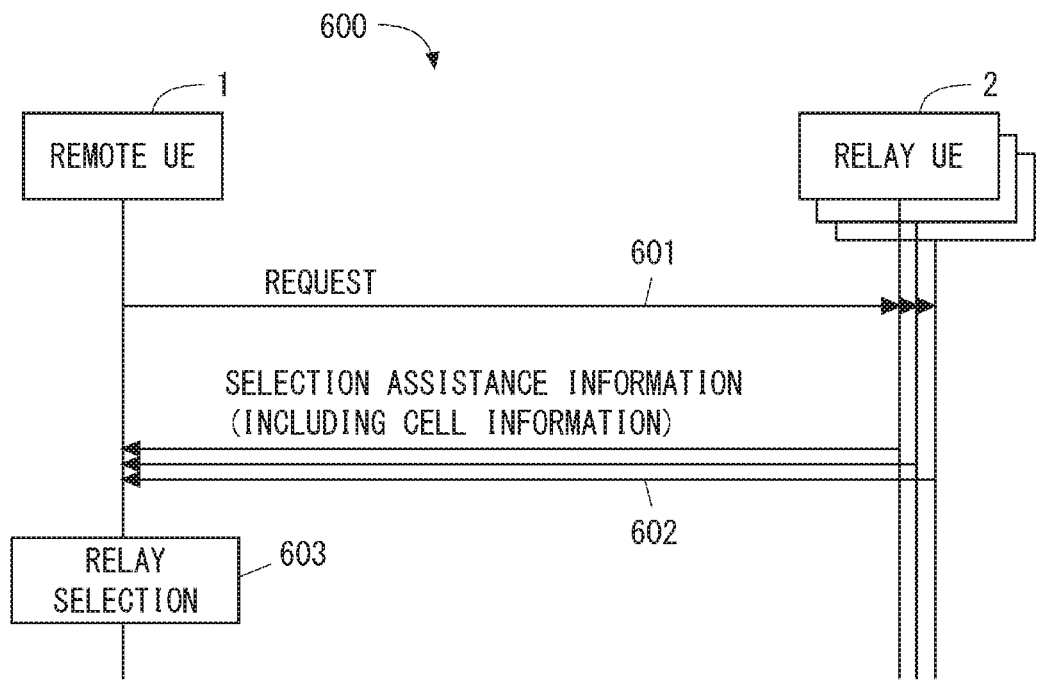
FIG. 6 is a sequence diagram showing an example of a procedure for starting a relay operation according to the first embodiment.

In the example shown FIG. 5, each relay UE 2 has to frequently transmit a radio signal (e.g., a discovery signal) in order to inform the remote UE 1 of the selection assistance information, and thus power consumption of each relay UE 2 could increase. In order to reduce the frequency of transmission of the selection assistance information performed by each relay UE 2, a relay selection procedure (a process 600) shown in FIG. 6 may be used. In Step 601, the remote UE 1 transmits a radio signal including a request for transmission of the selection assistance information. In Step 602, upon receiving the transmission request, each relay UE 2 transmits a radio signal including the selection assistance information to the remote UE 1.

Specifically, the remote UE 1 may transmit a discovery signal including the transmission request for the selection assistance information and each relay UE 2 may transmit a response signal including the selection assistance information to the remote UE 1 according to the so-called solicitation/response model (i.e., model B). In this way, the remote UE 1 can find relay UEs 2 by detecting their response signals and receive the selection assistance information of these relay UEs 2.

The process in Step 603 is similar to that in Step 502 in FIG. 5. That is, the remote UE 1 performs relay selection while considering the selection assistance information received from each relay UE 2.

Next, specific examples of the above-described cell information are described. The cell information can also be referred to as base-station information. The cell information (or base-station information) indicates a capability of the base station 3, or a capability(ies) of one or more cells provided by the base station 3. More specifically, the cell information may indicate, for example, at least one of:
(a) a frequency band supported by the base station 3;
(b) a system bandwidth supported by the base station 3;
(c) downlink transmission power of the base station 3;
(d) an uplink/downlink configuration of each cell that the base station 3 provides to each relay terminal 2;
(e) the number of cells that the base station 3 provides to each relay terminal 2;
(f) a type of one or more cells that the base station 3 provides to each relay terminal 2;
(g) a Radio Access Technology (RAT) or a communication scheme used between the base station 3 and each relay terminal 2; and
(h) a name or identifier of a mobile operator providing the base station 3 (or the cellular coverage 31).

The cell information (or base-station information) may indicate a frequency band supported by the base station 3, such as decimeter waves (or an Ultra High Frequency (UHF)), centimeter waves (or a Super high frequency (SHF)), and millimeter waves (or an Extremely high frequency (EHF)). In some implementations, the frequency band supported by the base station 3 is associated with a system bandwidth supported by the base station 3, or a RAT supported by the base station 3, or both, and accordingly it could affect the estimated throughput of the cellular link 101 between the base station 3 and each relay UE 2. In other words, the frequency band supported by the base station 3 can be used as one of the metrics for evaluating the throughput of the cellular link 101.

The cell information (or base-station information) may indicate a system bandwidth (e.g., 10 MHz, 20 MHz, 100 MHz, or 200 MHz) supported by the base station 3. The system bandwidth supported by the base station 3 could affect the estimated throughput of the cellular link 101 between the base station 3 and each relay UE 2. In other words, the system bandwidth supported by the base station 3 can be used as one of the metrics for evaluating the throughput of the cellular link 101.

The cell information (or base-station information) may indicate downlink transmission power of the base station 3. In some implementations, the downlink transmission power of the base station 3 is associated with the size or cell type (e.g., a macro cell, a micro cell, a pico cell, or a femto cell) of the cellular coverage 31 of the base station 3, while the size or cell type of the cellular coverage 31 is associated with the system bandwidth. Accordingly, in some implementations, the downlink transmission power of the base station 3 could affect the estimated throughput of the cellular link 101 between the base station 3 and each relay UE 2. In other words, the downlink transmission power of the base station 3 can be used as one of the metrics for evaluating the throughput of the cellular link 101.

The cell information (or base-station information) may indicate an uplink/downlink (UL/DL) configuration of each cell that the base station 3 provides to each relay terminal 2. The UL/DL configuration indicates a time ratio between the uplink and the downlink in the case where the cellular link 101 uses Time Division Duplex (TDD). In an example, the UL/DL configuration may indicate one of the seven types of UL/DL configurations supported in TDD LTE. In the case of TDD LTE, a plurality of uplink subframes (UL subframes) and a plurality of downlink subframes (DL subframes) coexist in one radio frame. The LTE-TDD UL/DL configuration indicates the arrangement of uplink and downlink subframes in one radio frame. Accordingly, in some implementations, the UL/DL configuration could affect the estimated throughput of the cellular link 101 between the base station 3 and each relay UE 2. In other words, the UL/DL configuration of each cell that the base station 3 provides to each relay terminal 2 can be used as one of the metrics for evaluating the throughput of the cellular link 101.

The cell information (or base-station information) may indicate the number of cells that the base station 3 provides to each relay terminal 2. The 3GPP Release 10 and the subsequent releases support Carrier Aggregation (CA). In CA, the relay UE 2 is configured by the base station with a plurality of cells having different frequencies (called Component Carriers (CCs)) and can use these component carriers for uplink communication or downlink communication or both. The plurality of CCs include one primary CC and one or more secondary CCs. The primary CC is also referred to as a primary frequency and is used for the primary cell (PCell). The secondary CC is also referred to as a secondary frequency and is used for a secondary cell (SCell). That is, the relay UE 2 configured with CA by the base station 3 can simultaneously use a plurality of serving cells including one primary cell and at least one secondary cell. Accordingly, in some implementations, the number of cells that the base station 3 provides to each relay terminal 2 could affect the estimated throughput of the cellular link 101 between the base station 3 and each relay UE 2. In other words, the number of cells that the base station 3 provides to each relay terminal 2 can be used as one of the metrics for evaluating the throughput of the cellular link 101.

The cell information (or base-station information) may indicate a type (e.g., a macro cell, a micro cell, a pico cell, or a femto cell) of one or more cells that the base station 3 provides to each relay terminal 2. In some implementations, the cell type is associated with the RAT or the system bandwidth supported by the base station 3. Accordingly, in some implementations, the type of one or more cells that the base station 3 provides to each relay terminal 2 could affect the estimated throughput of the cellular link 101 between the base station 3 and each relay UE 2. In other words, the type of one or more cells that the base station 3 provides to each relay terminal 2 can be used as one of the metrics for evaluating the throughput of the cellular link 101.

The cell information (or base-station information) may indicate a RAT or communication scheme (e.g., Long Term Evolution (LTE), LTE-Advanced, LTE-Advanced Pro, 5G, carrier aggregation, or dual connectivity) used between the base station 3 and each relay terminal 2. In some implementations, the RAT (or communication scheme) supported by the base station 3 could affect the estimated throughput of the cellular link 101 between the base station 3 and each relay UE 2. In other words, the frequency band supported by the base station 3 can be used as one of the metrics for evaluating the throughput of the cellular link 101.

The cell information (or base-station information) may indicate a name or identifier of a mobile operator that provides the base station 3 (or the cellular coverage 31). In some implementations, networks provided by different mobile operators support different system bandwidths, or support different RATs. Accordingly, in some implementations, the name or identifier of the mobile operator providing the base station 3 (or the cellular coverage 31) could affect the estimated throughput of the cellular link 101 between the base station 3 and each relay UE 2. In other words, the name or identifier of the mobile operator providing the base station 3 (or the cellular coverage 31) can be used as one of the metrics for evaluating the throughput of the cellular link 101.

Figure 7:
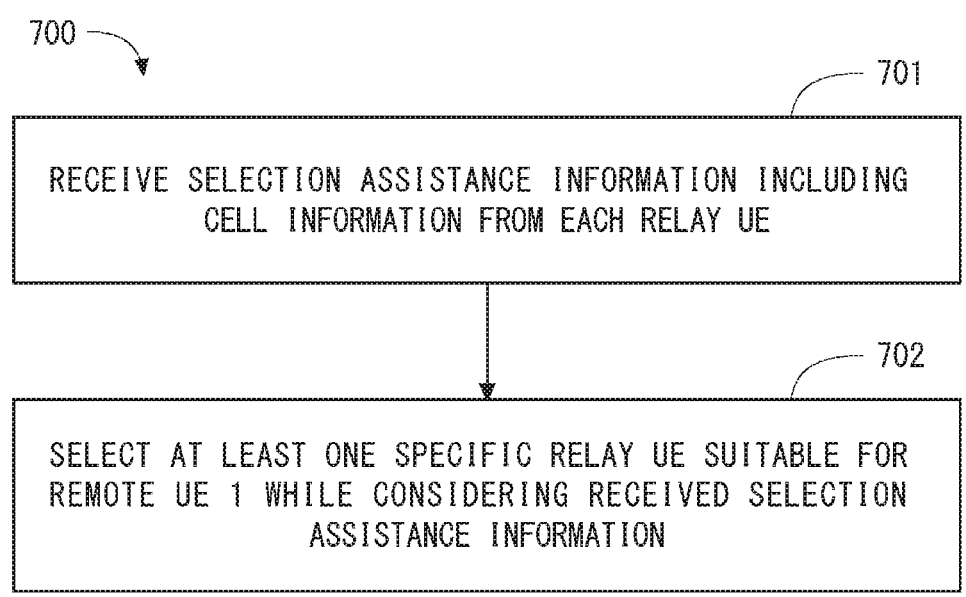
FIG. 7 is a flowchart showing an example of a relay selection procedure according to the first embodiment.

FIG. 7 is a flowchart showing a process 700 that is an example of a relay selecting procedure performed by a relay selecting entity disposed in the remote UE 1. In Step 701, the remote UE 1 (the relay selecting entity) receives selection assistance information from each relay UE 2. As already described, the selection assistance information includes at least cell information (or base-station information).

In Step 702, the remote UE 1 (the relay selecting entity) selects at least one specific relay UE 2 suitable for the remote UE 1 while considering the selection assistance information received from each relay UE 2. For example, the remote UE 1 may use the cell information received from each relay UE 2 to estimate one or both of uplink quality and downlink quality of the cellular link 101 of each relay UE 2. The remote UE 1 may acquire, derive, or estimate the system bandwidth of the base station 3 from the cell information, and may estimate the throughput of the cellular link 101 by using the obtained system bandwidth. Then, the remote UE 1 may select, as a specific relay UE 2 for the remote UE 1, at least one relay UE 2 having relatively high cellular link quality from among one or more relay UEs 2. Additionally or alternatively, the remote UE 1 may make comparisons among the estimated throughputs of one or more relay paths and the estimated throughput of the direct path, and select a path corresponding to the best estimated throughput for the remote UE 1.

As understood from the above description, in this embodiment, each relay UE (candidate) 2 transmits to the remote UE 1 the selection assistance information including cell information, and the remote UE 1 selects a relay while considering the received selection assistance information. Note that the cell information (or base-station information) indicates a capability of the base station 3 or a capability(ies) of one or more cells provided by the base station 3.

As already described, a relay UE 2 having the best DL RSRP is not necessarily able to provide the best throughput to a remote UE 1. As an example, when a system bandwidth (e.g., 100 MHz) available to a relay UE (e.g., a second relay UE) other than a first relay UE having the best DL RSRP is larger than a system bandwidth (e.g., 20 MHz) available to the first relay UE, the second relay UE may be able to provide a higher throughput to the remote UE 1 than the first relay UE is. In another example, when a RAT (e.g., NR or 5G RAT) used between a second relay UE and the base station 3 supports communication higher than that supported by a RAT (e.g., Long Term Evolution (LTE)) used between a first relay UE having the best DL RSRP and the base station 3, the second relay UE may be able to provide a higher throughput to the remote UE 1 than the first relay UE is. Accordingly, in some implementations, the cell information indicating a base station capability or a cell capability (e.g., the system bandwidth, the UL/DL configuration, or the RAT type), which could affect the throughput of the cellular link 101, may be taken into consideration for the cell selection. In this way, it is possible to contribute to improving appropriateness of the throughput-based relay selection.

Second Embodiment

This embodiment provides a modified example of the relay selection procedure described in the first embodiment. In this embodiment, a configuration example of a radio communication network and an example of a relay starting procedure are similar to those shown in FIGS. 1 to 5.

In this embodiment, each relay UE 2 transmits selection assistance information to the remote UE 1 as in the first embodiment. However, in this embodiment, the selection assistance information includes uplink quality information (i.e., a second information element) in addition to the above-described cell information (i.e., the first information element). The uplink quality information indicates quality of uplink transmission from each relay UE 2 to the base station 3.

The uplink quality information may indicate an estimated throughput of the uplink transmission performed by the relay UE 2. This estimated throughput may be calculated by each relay UE 2 and transmitted from each relay UE 2 to the remote UE 1.

Alternatively, the uplink quality information may indicate an uplink SINR.

Alternatively, the uplink quality information may indicate maximum transmission power of each relay UE 2, a path loss between each relay UE 2 and the base station 3, and an uplink radio resources per unit time allocated to each relay UE 2. The remote UE 1 may estimate an uplink Modulation and Coding Scheme (MCS) applied to each relay UE 2 by using the uplink quality information. Alternatively, the uplink quality information may indicate the uplink MCS itself applied to each relay UE 2. The uplink throughput of each relay UE 2 can be estimated from the uplink MCS applied to each relay UE 2 and the uplink radio resources per unit time allocated thereto. That is, the uplink MCS applied to each relay UE 2 closely relates to the uplink throughput of each relay UE 2.

Alternatively, the uplink quality information may indicate power-class information indicating maximum transmission power of each relay UE 2. LTE Prose specifies a high power UE having maximum transmission power of 31 dBm or 33 dBm for public safety. High power UEs having maximum transmission power of 31 dBm or 33 dBm are distinguished from ordinary UEs having maximum transmission power of 23 dBm, based on the UE power class. Specifically, The UE power class assigned to high power UEs is "Class 1" and, accordingly, high power UEs are also referred to as Class-1 UEs or Class-1 devices. Meanwhile, the UE power class for ordinary UEs is "Class 3" and, accordingly, ordinary UEs are also referred to as Class-3 UEs or Class-3 devices. It can be expected that high power UEs can provide a better uplink throughput than UEs having ordinary power (i.e., maximum transmission power of 23 dBm).

Additionally or alternatively, the uplink quality information may indicate a UE category (or a UE class) indicating an uplink communication capability of each relay UE 2. For example, the UE category may indicate a (maximum) uplink data rate supported by each relay UE 2. The UE category may indicate communication parameters supported by each relay UE 2, such as a duplex mode, a modulation scheme, and the maximum number of Multiple-Input Multiple-Output (MIMO) layers. It is expected that a relay UE 2 having a higher UE category (i.e., a higher communication capability) can provide a better uplink throughput.

In some implementations, the remote UE 1 may use the selection assistance information, which includes the cell information and the uplink quality information, to calculate an uplink throughput of a relay path consisting of the cellular link 101 and the D2D link 102. For example, the remote UE 1 may calculate an effective throughput $R_k$ of the k-th relay UE 2 according to the following Expression (1):

$$R_k = \min(D_k, U_k), \quad (1)$$

where the min function is a function that returns the minimum value among its arguments, $U_k$ is an estimated value of the uplink throughput of the cellular link 101, and $D_k$ is an estimated value of the throughput of the D2D link 102.

The estimated throughput values $U_k$ and $D_k$ may be calculated according to the Shannon capacity formula. For example, the value $U_k$ is defined by the following Expression (2):

$$U_k = R_U \cdot TBS_U(n_U, m_U) \cdot (1 - BLER(n_U, SINR_{U,k})), \quad (2)$$

where $R_U$ is a resource ratio for uplink transmission within a D2D control period, and $TBS_U(n_U, m_U)$ is an uplink transport block size when an uplink MCS index is equal to $n_U$ and the number of uplink resource blocks is equal to $m_U$. Further, $BLER(n_U, SINR_{U,k})$ is a block error rate when the uplink MCS index is equal to $n_U$ and the uplink SINR is equal to $SINR_{U,k}$. Note that, the D2D control period is also referred to as a sidelink control period or a PSCCH period. In LTE, sidelink transmission uses a subset of the uplink resources in the frequency and time domains, and a base station schedules radio resources for D2D communication in the time and frequency directions every D2D control period (e.g., 40 ms).

$D_k$ is defined by the following Expression (3):

$$D_k = R_D \cdot TBS_D(n_D, m_D) \cdot (1 - BLER(n_D, SINR_{D,k})), \quad (3)$$

where $R_D$ is a resource ratio for D2D transmission within a D2D control period, and $TBS_D(n_D, m_D)$ is a D2D transport block size when an MCS index of the D2D transmission is equal to $n_D$ and the number of D2D resource blocks is equal to $m_D$. Further, $BLER(n_D, SINR_{D,k})$ is a block error rate when the MCS index of the D2D transmission is equal to $n_D$ and the SINR of the D2D link is equal to $SINR_{D,k}$.

The combination of $n_U$ and $m_U$ used in the Expression (2) is obtained by the following Expression (4):

$$(n_U, m_U) = \underset{(n,m)}{\operatorname{argmax}}(TBS_U(n, m_U) \cdot (1 - BLER(n_U, SINR_{U,k}))), \quad (4)$$

where the arg max operator refers to a combination of the uplink MCS index n and the number m of uplink resource blocks with which a function indicated in the argument of this arg max operator is maximized.

In the example shown by the Expressions (1) to (4), the number ($m_U$) of uplink resource blocks is a function of the system bandwidth supported by the base station 3. In other words, the number $m_U$ of uplink resource blocks increases as the system bandwidth of the base station 3 increases. As already described in the first embodiment, the remote UE 1 may receive cell information (or base-station information) indicating the system bandwidth supported by the base station 3 from each relay UE 2. Meanwhile, in the example shown by the Expressions (1) to (4), the uplink SINR ($SINR_{U,k}$) is an example of the uplink quality information.

That is, the remote UE 1 can estimate the uplink throughput of the relay UE 2 more accurately by using the cell information (e.g., the system bandwidth) and the uplink quality information (e.g., the uplink SINR) received from the relay UE 2.

Third Embodiment

This embodiment provides a modified example of the relay selection procedure described in the first and second embodiments. In this embodiment, a configuration example of a radio communication network and an example of a relay starting procedure are similar to those shown in FIGS. 1 to 5.

In this embodiment, each relay UE 2 transmits selection assistance information to the remote UE 1 as in the first or second embodiment. However, in this embodiment, the selection assistance information further includes base-station load information (i.e., a third information element). The base-station load information indicates a load on the base station 3. The base-station load information may be a usage ratio of the uplink radio resources, a usage ratio of the computing resources of the base station 3, the number of UEs connected to the base station 3, or any combination thereof. Additionally or alternatively, the base-station load information may indicate an occupancy level of a downlink transmission buffer (or queue) of the base station 3, an occupancy level of an uplink reception buffer of the base station 3, or an occupancy level of other packet buffers regarding DL transmission or UL reception.

In some implementations, the remote UE 1 may use the base-station load information to estimate the effective throughput $R_k$ of each relay UE 2 more accurately. For example, in the calculation of the effective throughput $R_k$ described in the second embodiment, a constraint condition expressed by the following Expression (5) may be imposed on the variable m in the Expression (4):

$$m \leq (1 - L_U) \cdot M_U, \quad (5)$$

where $M_U$ is the maximum number of resource blocks determined based on the system bandwidth of the base station 3 and $L_U$ is a load on the base station 3. The load $L_U$ is no smaller than 0 and no larger than 1. The load $L_U$ may be a usage ratio of the uplink radio resources.

In some implementations, the remote UE 1 may use the base-station load information to evaluate whether or not it can perform transmission that satisfies a delay requirement. The delay requirement may be a maximum delay or an average delay. Here, the delay may be, for example, a delay time that is needed before data transmitted from the remote UE 1 reaches a destination node (e.g., the node 7 in FIG. 1) via the relay UE 2 and the base station 3.

Fourth Embodiment

This embodiment provides a modified example of the relay selection procedure described in the first to third embodiments. In this embodiment, a configuration example of a radio communication network and an example of a relay starting procedure are similar to those shown in FIGS. 1 to 5.

In this embodiment, each relay UE 2 transmits selection assistance information to the remote UE 1 as in the first, second or third embodiment. However, in this embodiment, the selection assistance information indicates relay load information. The relay load information may indicate the number of other remote UEs that are connected to or communicating with each relay UE 2. Additionally or alternatively, the relay load information may indicate a usage ratio of the D2D radio resources, an occupancy level of an uplink transmission buffer of the relay UE 2, an occupancy level of a downlink reception buffer (or queue) of the relay UE 2, or an occupancy level of other packet buffers regarding UL transmission or DL reception.

As the number of remote UEs connected to one relay UE 2 (or communicating with one relay UE 2) increases, an effective throughput that the relay UE 2 can provide to each of the remote UEs would decrease. Accordingly, the remote UE 1 may preferentially select, for this remote UE 1, a relay UE 2 with which a smaller number of remote UEs are connected or communicating. In this way, the remote UE 1 can select, for this remote UE 1, a relay UE 2 that can provide a higher effective throughput to a newly-connected remote UE 1.

In some implementations, the remote UE 1 may use the relay load information to estimate the effective throughput $R_k$ of each relay UE 2 more accurately. For example, in the calculation of the effective throughput $R_k$ described in the second embodiment, the following Expression (6) may be used instead of the Expression (3):

$$D_k = \frac{1}{N_{UE}+1} \cdot R_D \cdot TBS_D(n_D, m_D) \cdot (1 - BLER(n_D, SINR_{D,k})), \quad (6)$$

where $N_{UE}$ is the number of other remote UEs connected to or communicating with the k-th relay UE 2.

In some implementations, the remote UE 1 may use the relay load information, in addition to the base-station load information described in the third embodiment, in order to evaluate whether or not it can perform transmission that satisfies the delay requirement more accurately.

Fifth Embodiment

This embodiment provides a modified example of the relay selection procedure described in the first to fourth embodiments. In this embodiment, a configuration example of a radio communication network and an example of a relay starting procedure are similar to those shown in FIGS. 1 to 5.

In this embodiment, each relay UE 2 transmits selection assistance information to the remote UE 1 as in the first, second, third or fourth embodiment. However, in this embodiment, the selection assistance information further indicates a path loss between each relay UE 2 and the base station 3. The sidelink transmission power of a relay UE in the 3GPP is controlled according to a path loss between the base station 3 and the relay UE 2. As the path loss increases, the sidelink transmission power of the relay UE 2 increases.

Accordingly, the remote UE 1 may use the path loss between each relay UE 2 and the base station 3 to estimate the sidelink transmission power of each relay UE 2. In other words, the remote UE 1 may use the path loss between each relay UE 2 and the base station 3 to estimate the (maximum) transmission power to be required for sidelink transmission to each relay UE 2. For example, the remote UE 1 may preferentially select, for this remote UE 1, a relay UE 2 for which the required sidelink transmission power is the smallest. Alternatively, the remote UE 1 may compare the sidelink transmission power (or the power consumption required for the sidelink transmission) in the relay path with the uplink transmission power (or the power consumption required for the uplink transmission) in the direct path, and select a path that will result in smaller transmission power (or smaller power consumption).

Figure 8:
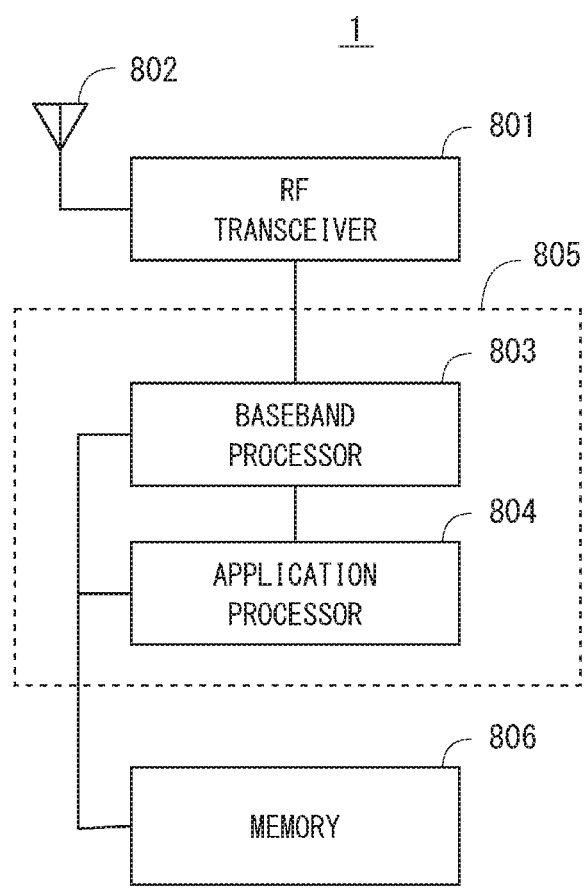
FIG. 8 is a block diagram showing a configuration example of a radio terminal according to a plurality of embodiments.

Lastly, configuration examples of the remote UE 1, the relay UE 2, and the base station 3 according to the above-described embodiments will be described. FIG. 8 is a block diagram showing a configuration example of the remote UE 1. The relay UE 2 may have a configuration similar to that shown in FIG. 8. A Radio Frequency (RF) transceiver 801 performs an analog RF signal processing to communicate with the base station 3. The analog RF signal processing performed by the RF transceiver 801 includes a frequency up-conversion, a frequency down-conversion, and amplification. The RF transceiver 801 is coupled to an antenna 802 and a baseband processor 803. That is, the RF transceiver 801 receives modulated symbol data (or OFDM symbol data) from the baseband processor 803, generates a transmission RF signal, and supplies the generated transmission RF signal to the antenna 802. Further, the RF transceiver 801 generates a baseband reception signal based on a reception RF signal received by the antenna 802 and supplies the generated baseband reception signal to the baseband processor 803.

The baseband processor 803 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). On the other hand, the control-plane processing includes communication management of layer (e.g., transmission power control), layer 2 (e.g., radio resource management and hybrid automatic repeat request (HARQ) processing), and layer 3 (e.g., signaling regarding attach, mobility, and call management).

For example, in the case of LTE or LTE-Advanced, the digital baseband signal processing performed by the baseband processor 803 may include signal processing of Packet Data Convergence Protocol (PDCP) layer, Radio Link Control (RLC) layer, MAC layer, and PHY layer. Further, the control-plane processing performed by the baseband processor 803 may include processing of Non-Access Stratum (NAS) protocol, RRC protocol, and MAC CE.

The baseband processor 803 may include a modem processor (e.g., Digital Signal Processor (DSP)) that performs the digital baseband signal processing and a protocol stack processor (e.g., Central Processing Unit (CPU) or a Micro Processing Unit (MPU)) that performs the control-plane processing. In this case, the protocol stack processor, which performs the control-plane processing, may be integrated with an application processor 804 described in the following.

The application processor 804 may also be referred to as a CPU, an MPU, a microprocessor, or a processor core. The application processor 804 may include a plurality of processors (processor cores). The application processor 804 loads a system software program (Operating System (OS)) and various application programs (e.g., voice call application, WEB browser, mailer, camera operation application, and music player application) from a memory 806 or from another memory (not shown) and executes these programs, thereby providing various functions of the remote UE 1.

In some implementations, as represented by a dashed line (805) in FIG. 8, the baseband processor 803 and the application processor 804 may be integrated on a single chip. In other words, the baseband processor 803 and the application processor 804 may be implemented in a single System on Chip (SoC) device 805. A SoC device may be referred to as a system Large Scale Integration (LSI) or a chipset.

The memory 806 is a volatile memory, a nonvolatile memory, or a combination thereof. The memory 806 may include a plurality of memory devices that are physically independent from each other. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 806 may include, for example, an external memory device that can be accessed by the baseband processor 803, the application processor 804, and the SoC 805. The memory 806 may include an internal memory device that is integrated in the baseband processor 803, the application processor 804, or the SoC 805. Further, the memory 806 may include a memory in a Universal Integrated Circuit Card (UICC).

The memory 806 may store software modules (computer programs) including instructions and data to perform processing by the remote UE 1 described in the above embodiments. In some implementations, the baseband processor 803 or the application processor 804 may be configured to load the software modules from the memory 806 and execute the loaded software modules, thereby performing the processing of the remote UE 1 described in the above embodiments with reference to the sequence diagrams and the flowcharts.

Figure 9:
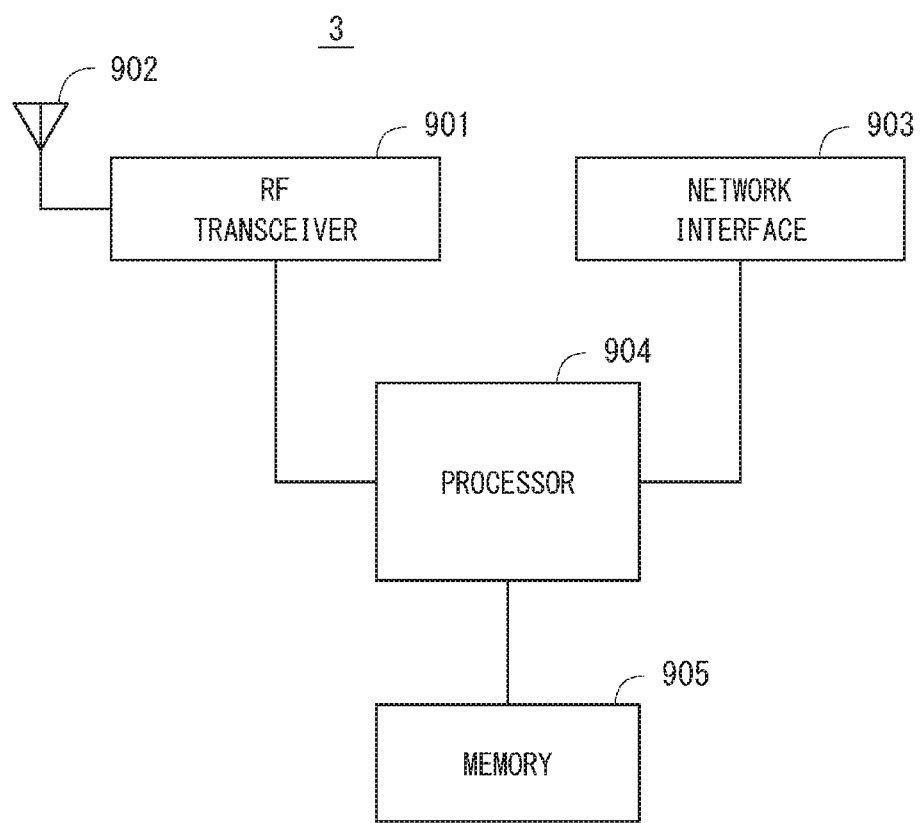
FIG. 9 is a block diagram showing a configuration example of a base station according to a plurality of embodiments.

FIG. 9 is a block diagram showing a configuration example of the base station 3 according to the above-described embodiments. As shown in FIG. 9, the base station 3 includes an RF transceiver 901, a network interface 903, a processor 904, and a memory 905. The RF transceiver 901 performs analog RF signal processing to communicate with the remote UE 1 and the relay UE 2. The RF transceiver 901 may include a plurality of transceivers. The RF transceiver 901 is connected to an antenna 902 and the processor 904. The RF transceiver 901 receives modulated symbol data (or OFDM symbol data) from the processor 904, generates a transmission RF signal, and supplies the generated transmission RF signal to the antenna 902. Further, the RF transceiver 901 generates a baseband reception signal based on a reception RF signal received by the antenna 902 and supplies this signal to the processor 904.

The network interface 903 is used to communicate with a network node (e.g., Mobility Management Entity (MME) and Serving Gateway (S-GW)). The network interface 903 may include, for example, a network interface card (NIC) conforming to the IEEE 802.3 series.

The processor 904 performs digital baseband signal processing (data-plane processing) and control-plane processing for radio communication. For example, in the case of LTE or LTE-Advanced, the digital baseband signal processing performed by the processor 904 may include signal processing of the PDCP layer, RLC layer, MAC layer, and PHY layer. Further, the control-plane processing performed by the processor 904 may include processing of S1 protocol, RRC protocol, and MAC CE.

The processor 904 may include a plurality of processors. For example, the processor 904 may include a modem-processor (e.g., DSP) that performs the digital baseband signal processing, and a protocol-stack-processor (e.g., CPU or MPU) that performs the control-plane processing.

The memory 905 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or a combination thereof. The memory 905 may include a storage located apart from the processor 904. In this case, the processor 904 may access the memory 905 through the network interface 903 or an I/O interface (not shown).

The memory 905 may store software modules (computer programs) including instructions and data to perform processing by the base station 3 described in the above embodiments. In some implementations, the processor 904 may be configured to load the software modules from the memory 905 and execute the loaded software modules, thereby performing the processing of the base station 3 described in the above embodiments with reference to the sequence diagrams and the flowcharts.

As described above with reference to FIGS. 8 and 9, each of the processors included in the remote UE 1, the relay UE 2, and the base station 3 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

Other Embodiments

Each of the above embodiments may be used individually, or two or more of the embodiments may be appropriately combined with one another.

Further, the above-described embodiments are merely examples of applications of the technical ideas obtained by the inventor. These technical ideas are not limited to the above-described embodiments and various modifications can be made thereto.

For example, the whole or part of the embodiments disclosed above can be described as, but not limited to, the following supplementary notes.

(Supplementary Note 1)

A radio terminal comprising:

a memory; and at least one processor coupled to the memory and configured to receive selection assistance information from each of one or more relay terminals and select at least one specific relay terminal suitable for the radio terminal from among the one or more relay terminals based on the selection assistance information, wherein each specific relay terminal is configured to relay traffic between the radio terminal and a base station through a device-to-device (D2D) link between the specific relay terminal and the radio terminal and through a backhaul link between the specific relay terminal and the base station, the selection assistance information includes a first information element transmitted from the base station and received by each relay terminal, and the first information element indicates at least one of:
(a) a frequency band supported by the base station;
(b) a system bandwidth supported by the base station;
(c) downlink transmission power of the base station;
(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

(Supplementary Note 2)
The radio terminal described in Supplementary note 1, wherein the first information element indicates at least the system bandwidth supported by the base station.

(Supplementary Note 3)
The radio terminal described in Supplementary note 1 or 2, wherein the first information element indicates at least the uplink/downlink configuration of each cell that the base station provides to each relay UE.

(Supplementary Note 4)
The radio terminal described in any one of Supplementary notes 1 to 3, wherein the selection assistance information further includes a second information element indicating quality of uplink transmission from each relay terminal to the base station.

(Supplementary Note 5)
The radio terminal described in Supplementary note 4, wherein the second information element includes one or both of: power-class information indicating maximum transmission power of each relay terminal; and terminal category information indicating uplink communication capability of each relay terminal.

(Supplementary Note 6)
The radio terminal described in Supplementary note 4 or 5, wherein the second information element includes an estimated value of a Modulation and Coding Scheme (MCS) applied to the uplink transmission performed by each relay terminal.

(Supplementary Note 7)
The radio terminal described in any one of Supplementary notes 1 to 6, wherein the selection assistance information further includes a third information element indicating a load on the base station.

(Supplementary Note 8)
The radio terminal described in any one of Supplementary notes 1 to 7, wherein the selection assistance information further includes a fourth information element indicating a load on each relay terminal.

(Supplementary Note 9)
The radio terminal described in Supplementary note 8, wherein the fourth information element indicates the number of other remote terminals connected to or communicating with each relay terminal.

(Supplementary Note 10)
The radio terminal described in Supplementary note 9, wherein the at least one processor is configured to preferentially select, as the at least one specific relay terminal, a relay terminal with which the number of other remote terminals connected or communicating is smaller.

(Supplementary Note 11)
The radio terminal described in any one of Supplementary notes 1 to 10, wherein the selection assistance information further includes a fifth information element indicating a path loss between the base station and each relay terminal.

(Supplementary Note 12)
The radio terminal described in any one of Supplementary notes 1 to 11, wherein the at least one processor is configured to determine which of a relay path, which passes through any of the one or more relay terminals, and a direct radio link between the radio terminal and the base station or another base station is to be used for communication performed by the radio terminal.

(Supplementary Note 13)
A relay terminal comprising:
a memory; and
at least one processor coupled to the memory and configured to:
transmit selection assistance information to the remote terminal; and
relay traffic between the remote terminal and a base station through a device-to-device (D2D) link between the relay terminal and the remote terminal and through a backhaul link between the relay terminal and the base station, wherein
the selection assistance information includes a first information element transmitted from the base station and received by the relay terminal, and
the first information element indicates at least one of:
(a) a frequency band supported by the base station;
(b) a system bandwidth supported by the base station;
(c) downlink transmission power of the base station;
(d) an uplink/downlink configuration of each cell that the base station provides to the relay terminal;
(e) the number of cells that the base station provides to the relay terminal;
(f) a type of one or more cells that the base station provides to the relay terminal;
(g) a Radio Access Technology (RAT) or a communication scheme used between the base station and the relay terminal; and
(h) a name or identifier of a mobile operator providing the base station.

(Supplementary Note 14)
The relay terminal described in Supplementary note 13, wherein the selection assistance information triggers the remote terminal to select at least one specific relay terminal suitable for the remote terminal from among one or more relay terminals.

(Supplementary Note 15)
The relay terminal described in Supplementary note 13 or 14, wherein the selection assistance information triggers the remote terminal to determine which of a relay path, which passes through any relay terminal, and a direct radio link between the radio terminal and the base station or another base station is to be used for communication performed by the remote terminal.

(Supplementary Note 16)

The relay terminal described in any one of Supplementary notes 13 to 15, wherein the first information element indicates at least the system bandwidth supported by the base station.

(Supplementary Note 17)

The relay terminal described in any one of Supplementary notes 13 to 16, wherein the first information element indicates at least the uplink/downlink configuration of each cell that the base station provides to each relay UE.

(Supplementary Note 18)

The relay terminal described in any one of Supplementary notes 13 to 17, wherein the selection assistance information further includes a second information element indicating quality of uplink transmission from the relay terminal to the base station.

(Supplementary Note 19)

The relay terminal described in Supplementary note 18, wherein the second information element includes one or both of: power-class information indicating maximum transmission power of the relay terminal; and terminal category information indicating uplink communication capability of the relay terminal.

(Supplementary Note 20)

The relay terminal described in Supplementary note 18 or 19, wherein the second information element includes an estimated value of a Modulation and Coding Scheme (MCS) applied to the uplink transmission performed by the relay terminal.

(Supplementary Note 21)

The relay terminal described in any one of Supplementary notes 13 to 20, wherein the selection assistance information further includes a third information element indicating a load on the base station.

(Supplementary Note 22)

The relay terminal described in any one of Supplementary notes 13 to 21, wherein the selection assistance information further includes a fourth information element indicating a load on the relay terminal.

(Supplementary Note 23)

The relay terminal described in Supplementary note 22, wherein the fourth information element indicates the number of other remote terminals connected to or communicating with the relay terminal.

(Supplementary Note 24)

The relay terminal described in any one of Supplementary notes 13 to 23, wherein the selection assistance information further includes a fifth information element indicating a path loss between the base station and the relay terminal.

(Supplementary Note 25)

A method performed in a radio terminal, the method comprising:

receiving selection assistance information from each of one or more relay terminals; and selecting at least one specific relay terminal suitable for the radio terminal from among the one or more relay terminals based on the selection assistance information, wherein each specific relay terminal is configured to relay traffic between the radio terminal and a base station through a device-to-device (D2D) link between the specific relay terminal and the radio terminal and through a backhaul link between the specific relay terminal and the base station, the selection assistance information includes a first information element transmitted from the base station and received by each relay terminal, and the first information element indicates at least one of:
(a) a frequency band supported by the base station;
(b) a system bandwidth supported by the base station;
(c) downlink transmission power of the base station;
(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

(Supplementary Note 26)

A method performed in a relay terminal, the method comprising:

transmitting selection assistance information to a remote terminal, and relaying traffic between the remote terminal and a base station through a device-to-device (D2D) link between the relay terminal and the remote terminal and through a backhaul link between the relay terminal and the base station, wherein the selection assistance information includes a first information element transmitted from the base station and received by the relay terminal, and the first information element indicates at least one of:
(a) a frequency band supported by the base station;
(b) a system bandwidth supported by the base station;
(c) downlink transmission power of the base station;
(d) an uplink/downlink configuration of each cell that the base station provides to the relay terminal;
(e) the number of cells that the base station provides to the relay terminal;
(f) a type of one or more cells that the base station provides to the relay terminal;
(g) a Radio Access Technology (RAT) or a communication scheme used between the base station and the relay terminal; and
(h) a name or identifier of a mobile operator providing the base station.

(Supplementary Note 27)

A program for causing a computer to perform a method in a radio terminal, wherein the method comprises:

receiving selection assistance information from each of one or more relay terminals; and selecting at least one specific relay terminal suitable for the radio terminal from among the one or more relay terminals based on the selection assistance information, each specific relay terminal is configured to relay traffic between the radio terminal and a base station through a device-to-device (D2D) link between the specific relay terminal and the radio terminal and through a backhaul link between the specific relay terminal and the base station, the selection assistance information includes a first information element transmitted from the base station and received by each relay terminal, and the first information element indicates at least one of:
(a) a frequency band supported by the base station;
(b) a system bandwidth supported by the base station;
(c) downlink transmission power of the base station;

(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

(Supplementary Note 28)

A program for causing a computer to perform a method in a relay terminal, wherein the relay terminal is configured to relay traffic between a remote terminal and a base station through a device-to-device (D2D) link between the relay terminal and the remote terminal and through a backhaul link between the relay terminal and the base station, the method comprises transmitting selection assistance information to the remote terminal, the selection assistance information includes a first information element transmitted from the base station and received by the relay terminal, and the first information element indicates at least one of:
(a) a frequency band supported by the base station;
(b) a system bandwidth supported by the base station;
(c) downlink transmission power of the base station;
(d) an uplink/downlink configuration of each cell that the base station provides to the relay terminal;
(e) the number of cells that the base station provides to the relay terminal;
(f) a type of one or more cells that the base station provides to the relay terminal;
(g) a Radio Access Technology (RAT) or a communication scheme used between the base station and the relay terminal; and
(h) a name or identifier of a mobile operator providing the base station.

REFERENCE SIGNS LIST

1 REMOTE UE
2 RELAY UE
3 BASE STATION
4 CORE NETWORK
5 device-to-device (D2D) CONTROLLER
6 EXTERNAL NETWORK
7 NODE
8 BASE STATION
101 CELLULAR LINK
102 D2D LINK
201 CELLULAR LINK
801 radio frequency (RF) TRANSCEIVER
803 BASEBAND PROCESSOR
804 APPLICATION PROCESSOR
806 MEMORY
904 PROCESSOR
905 MEMORY

The invention claimed is:

1. A radio terminal comprising:
a memory; and
at least one processor coupled to the memory and configured to receive selection assistance information from each of one or more relay terminals and select at least one specific relay terminal suitable for the radio terminal from among the one or more relay terminals based on the selection assistance information, wherein each specific relay terminal is configured to relay traffic between the radio terminal and a base station through a device-to-device (D2D) link between the specific relay terminal and the radio terminal and through a backhaul link between the specific relay terminal and the base station, the selection assistance information includes a first information element transmitted from the base station and received by each relay terminal, and the first information element indicates at least one of:
(a) a frequency band supported by the base station;
(b) a system bandwidth supported by the base station;
(c) downlink transmission power of the base station;
(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

2. The radio terminal according to claim 1, wherein the first information element indicates at least the system bandwidth supported by the base station.

3. The radio terminal according to claim 1, wherein the first information element indicates at least the uplink/downlink configuration of each cell that the base station provides to each relay UE.

4. The radio terminal according to claim 1, wherein the selection assistance information further includes a second information element indicating quality of uplink transmission from each relay terminal to the base station.

5. The radio terminal according to claim 4, wherein the second information element includes one or both of: power-class information indicating maximum transmission power of each relay terminal; and terminal category information indicating uplink communication capability of each relay terminal.

6. The radio terminal according to claim 4, wherein the second information element includes an estimated value of a Modulation and Coding Scheme (MCS) applied to the uplink transmission performed by each relay terminal.

7. The radio terminal according to claim 1, wherein the selection assistance information further includes a third information element indicating a load on the base station.

8. The radio terminal according to claim 1, wherein the selection assistance information further includes a fourth information element indicating a load on each relay terminal.

9. The radio terminal according to claim 8, wherein the fourth information element indicates the number of other remote terminals connected to or communicating with each relay terminal.

10. The radio terminal according to claim 9, wherein the at least one processor is configured to preferentially select, as the at least one specific relay terminal, a relay terminal with which the number of other remote terminals connected or communicating is smaller.

11. The radio terminal according to claim 1, wherein the selection assistance information further includes a fifth information element indicating a path loss between the base station and each relay terminal.

12. The radio terminal according to claim 1, wherein the at least one processor is configured to determine which of a relay path, which passes through any of the one or more relay terminals, and a direct radio link between the radio terminal and the base station or another base station is to be used for communication performed by the radio terminal.

13. A relay terminal comprising:
a memory; and
at least one processor coupled to the memory and configured to:
  transmit selection assistance information to the remote terminal; and
  relay traffic between the remote terminal and a base station through a device-to-device (D2D) link between the relay terminal and the remote terminal and through a backhaul link between the relay terminal and the base station, wherein
the selection assistance information includes a first information element transmitted from the base station and received by the relay terminal, and
the first information element indicates at least one of:
(a) a frequency band supported by the base station;
(b) a system bandwidth supported by the base station;
(c) downlink transmission power of the base station;
(d) an uplink/downlink configuration of each cell that the base station provides to the relay terminal;
(e) the number of cells that the base station provides to the relay terminal;
(f) a type of one or more cells that the base station provides to the relay terminal;
(g) a Radio Access Technology (RAT) or a communication scheme used between the base station and the relay terminal; and
(h) a name or identifier of a mobile operator providing the base station.

14. The relay terminal according to claim 13, wherein the selection assistance information triggers the remote terminal to select at least one specific relay terminal suitable for the remote terminal from among one or more relay terminals.

15. The relay terminal described in claim 13, wherein the selection assistance information triggers the remote terminal to determine which of a relay path, which passes through any relay terminal, and a direct radio link between the radio terminal and the base station or another base station is to be used for communication performed by the remote terminal.

16. The relay terminal according to claim 13, wherein the first information element indicates at least the system bandwidth supported by the base station.

17. The relay terminal according to claim 13, wherein the first information element indicates at least the uplink/downlink configuration of each cell that the base station provides to each relay UE.

18. The relay terminal according to claim 13, wherein the selection assistance information further includes a second information element indicating quality of uplink transmission from the relay terminal to the base station.

19. The relay terminal according to claim 18, wherein the second information element includes one or both of: power-class information indicating maximum transmission power of the relay terminal; and terminal category information indicating uplink communication capability of the relay terminal.

20. A method performed in a radio terminal, the method comprising:
  receiving selection assistance information from each of one or more relay terminals; and
  selecting at least one specific relay terminal suitable for the radio terminal from among the one or more relay terminals based on the selection assistance information, wherein
each specific relay terminal is configured to relay traffic between the radio terminal and a base station through a device-to-device (D2D) link between the specific relay terminal and the radio terminal and through a backhaul link between the specific relay terminal and the base station,
the selection assistance information includes a first information element transmitted from the base station and received by each relay terminal, and
the first information element indicates at least one of:
(a) a frequency band supported by the base station;
(b) a system bandwidth supported by the base station;
(c) downlink transmission power of the base station;
(d) an uplink/downlink configuration of each cell that the base station provides to each relay terminal;
(e) the number of cells that the base station provides to each relay terminal;
(f) a type of one or more cells that the base station provides to each relay terminal;
(g) a Radio Access Technology (RAT) or a communication scheme used between the base station and each relay terminal; and
(h) a name or identifier of a mobile operator providing the base station.

* * * * *